United States Patent Office

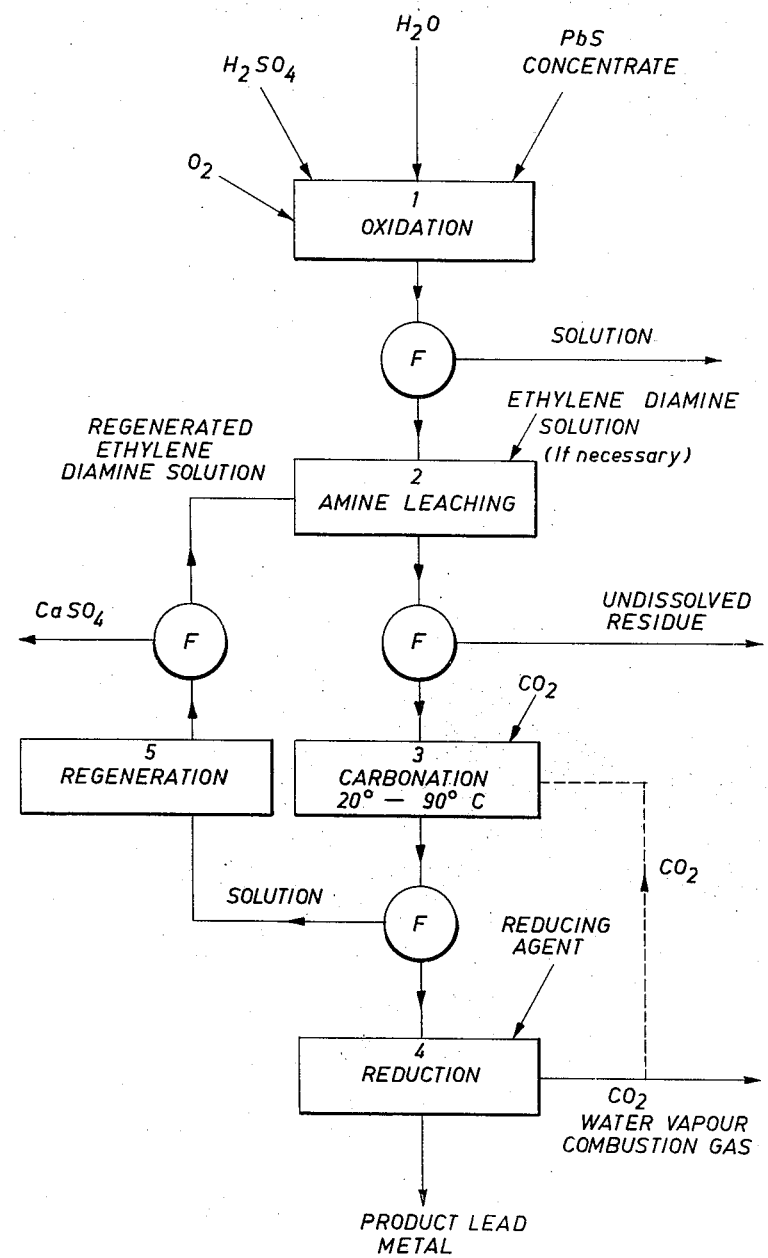

2,950,964
Patented Aug. 30, 1960

2,950,964

PROCESS FOR THE PRODUCTION OF LEAD

Frank A. Forward, Vancouver, British Columbia, Herbert Veltman, Richmond, British Columbia, and Andrew Imre Vizsolyi, Vancouver, British Columbia, Canada, assignors to Sherritt Gordon Mines Limited, Toronto, Ontario, Canada, a company of Ontario Filed May 13, 1959, Ser. No. 812,959

9 Claims. (Cl. 75—103)

This invention relates to a method of producing lead in elemental form substantially free from impurities.

Methods are known and are in widespread use for producing lead from mineral ores and concentrates, scrap or secondary metals, metallurgical plant by-products and residues and the like lead-bearing materials. Such methods usually include pyrometallurgical processes such as roasting or sintering, smelting in a reducing atmosphere to form lead bullion and treatment of the lead bullion to separate impurities which otherwise would contaminate the purity of desired lead product metal.

Known, conventional methods have a number of important disadvantages. Apparatus and equipment are costly to install and operate, particularly in the present era of progressively rising capital and operating costs. In view of the smoke and fume evolved, the plants usually must be located in areas remote from centres of population or, alternatively, costly smoke and fume treating equipment must be provided.

Hydrometallurgical methods are known and are in use for the treatment of metal bearing material for the recovery of metals such as zinc, copper, nickel, cobalt, gold and silver. Such methods involve, usually, a leaching step in which the metal of interest is extracted from the metal bearing material and dissolved in a leach solution. The leach solution, after separation from undissolved residue, is then treated for the recovery of the metal of interest, either as product metal or a metal salt substantially free from impurities.

Hydrometallurgical methods of treating lead bearing metal for the production of product lead metal which meets market requirements have not been developed on a commercially practical scale. Reasons for this may be the relatively low market value of the metal; the relatively high cost of leach solutions in which lead and lead salts are soluble, difficulties in the treatment of known leach solutions for the recovery therefrom of the dissolved lead values substantially free from impurities, and the possible loss of precious metals, such as silver or gold, which may be contained in the lead bearing material.

We have found that problems heretofore associated with the production of lead substantially free from impurities by essentially hydrometallurgical processes have been overcome by the method of treating lead bearing material described in detail hereinafter.

The present method involves, in its simplest form, the dispersion of lead bearing material in a basic aqueous leach solution which contains a member selected from the group consisting of alkylene and alkanol amines and derivatives thereof which is soluble in water and which is present in amount at least sufficient to combine with the lead content of said material. The lead contained in the lead bearing material is in the form of certain oxidized compounds of lead such as lead sulphate, lead oxide, lead chloride, lead acetate and lead nitrate. Oxidized compounds of lead such as lead peroxide and lead chromate are found to be relatively insoluble in this type of leach solution.

We have found that these lead compounds are soluble in basic aqueous leach solutions which contain a member selected from the described group of alkylene and alkanol amines and derivatives thereof. Such solutions include, for example, ethylene diamine, diethylene triamine, triethylene tetramine, tetraethylene pentamine, propylene diamine, monoethanol amine, diethanol amine and triethanol amine and derivatives including the acid salts thereof.

We have found, further, commercially practical methods of:

(a) Preparing the lead content of lead bearing material in an oxidized form in which it is readily soluble in a leach solution of the class described;

(b) Precipitating from a leach solution of the class described dissolved lead values substantially free from contamination by impurities associated with the lead in the lead bearing starting material;

(c) Reducing the precipitated lead values to metallic lead substantially free from impurities, for example of a purity of the order of 99.99% or higher;

(d) Treating the spent leach solution for recovering and recycling the reagent content thereof; and (e) Treating the undissolved residue from the amine leaching step for the recovery of economically valuable constituents.

The operation of the method of this invention is described in detail hereinafter, reference being made to the accompanying flow sheet drawing, as applied to the production of lead of a purity of 99.99% or higher from a lead sulphide concentrate which contains, also, values of zinc and silver. The first step of the process is a preferred method of converting the lead into the form of lead sulphate, in which form it is highly soluble in the amine leach solution. The subsequent steps which follow the leaching step are preferred procedures for precipitating dissolved lead values from the solution, for reducing the precipitated lead values to metallic form, for regenerating the leach solution, and for the treatment of undissolved residues. It will be understood that these specific procedures can be modified or other procedures can be adopted to meet the requirements of specific lead bearing material without departing from the scope of the invention.

The following Table I illustrates the solubility of lead sulphate in various types of alkylene and alkanol amine solutions at room temperature, about 20° C. In each instance an aqueous leach solution was employed which contained 2 mols of the specified reagent per litre of solution and the reaction was continued, with agitation, until equilibrium was reached.

TABLE I

*Solubility of lead sulphate in various amine solutions at 20° C.*

[Solution strength = 2 mols amine per litre]

|  | Reagent, g.p.l. | Pb in Solution, g.p.l. |
|---|---|---|
| Alkylene Amines: |  |  |
| Ethylene Diamine | 120 | 90 |
| Diethylene Triamine | 206 | 304 |
| Triethylene Tetramine | 292 | 302 |
| Tetraethylene Pentamine | 378 | 364 |
| Alkanol Amines: |  |  |
| Monoethanolamine | 122 | 5 |
| Diethanolamine | 210 | 125 |
| Triethanolamine | 298 | 44 |
| Alkyl Amines: |  |  |
| Methylamine | 62 | Nil |
| Ethylamine | 90 | Nil |
| N-Propylamine | 118 | Nil |
| Isopropylamine | 118 | Nil |
| Cyclohexylamine | 198 | Nil |

It will be noted from the above table:

(a) That satisfactory leaching results can be obtained by the use of any of the alkylene amines tested;

(b) That while alkanol amines are less satisfactory, they can be employed, if desired, as leaching reagents for lead bearing material;

(c) That alkyl amines are not suitable as leaching reagents for lead bearing material.

If the lead contained in the lead bearing material is in the form of an oxidized salt such as lead sulphate, lead chloride, lead nitrate, lead acetate and the like, it can be charged directly into the amine leaching step. However, if the lead is in metallic form or in the form of a salt which is not readily and substantially completely soluble in the amine solution, it should be converted into such a form either in a preliminary treatment or during leaching.

It is found, for example, that lead sulphide can be converted readily to lead sulphate or basic lead sulphate, such as by roasting it in an oxidizing atmosphere.

The oxidation of lead sulphide to lead sulphate in an aqueous solution in the presence of a free oxygen containing gas is sulphate forming. It can be conducted in water to which no acid is added or it can be conducted in a solution in which sulphuric acid is present.

The oxidation reactions can be expressed by the equations:

$$PbS + 2O_2 \rightarrow PbSO_4$$

$$PbS + H_2SO_4 + \tfrac{1}{2}O_2 \rightarrow PbSO_4 + S° + H_2O$$

The mixture of solids and solution contained from 15% to 33% solids and the reaction was conducted at an oxygen partial pressure of 20 pounds per square inch. Oxygen was employed as the oxidizing medium.

The following Tables II and III illustrate the results obtained in the oxidation of lead sulphide in an aqueous acid solution which contains, respectively about 1.05 mols of sulphuric acid per mol of lead and water which initially contained no acid. The lead sulphide concentrate contained, by weight, 62.8% lead, 3.5% zinc, 12.7% iron, 17.6% sulphur, about 1.1% insoluble matter and 15.4 ounces of silver per ton.

TABLE II

*Effect of acid and temperature on conversion of PbS to PbSO₄*

["Acid" series—1.05 mols H₂SO₄ added per mol of Pb]

| Test No. | A-3 | | A-5 | | A-7 | | A-1 | | A-6 | |
|---|---|---|---|---|---|---|---|---|---|---|
| Temp., °C | 70 | | 80 | | 90 | | 140 | | 150 | |
| | Percent Pb Converted to PbSO₄ | pH | Percent Pb Converted to PbSO₄ | pH | Percent Pb Converted to PbSO₄ | pH | Percent Pb Converted to PbSO₄ | pH | Percent Pb Converted to PbSO₄ | pH |
| Time hrs.: | | | | | | | | | | |
| 0 | 19 | 1.4 | 48 | 1.2 | 53 | 1.2 | 83 | 1.5 | 88 | 1.3 |
| ½ | 62 | 3.5 | 84 | 2.9 | 91 | 2.6 | 92 | 1.1 | 90 | 1.2 |
| 1 | 76 | 3.5 | 90 | 2.7 | 95 | 2.4 | 96 | 1.0 | 92 | 1.0 |
| 2 | 93 | 3.0 | 97 | 2.6 | 99 | 2.3 | 96 | 1.0 | 92 | 1.0 |
| 3 | 96 | 2.8 | | | | | 97 | 1.0 | | |

The solid residue at the end of the test conducted at 90° C. contained 47.7% lead as lead sulphate, 3.0% zinc, 10.4% iron, 11 ounces of silver per ton, about 1% insoluble matter, total sulphur 18%, and elemental sulphur 11.6%.

TABLE III

["Neutral" series—water only—no acid added]

| Test No. | N-4 | | N-5 | | N-1 | | N-5 | |
|---|---|---|---|---|---|---|---|---|
| Temp., °C | 110 | | 130 | | 140 | | 150 | |
| | Percent Pb Converted to PbSO₄ | pH | Percent Pb Converted to PbSO₄ | pH | Percent Pb Converted to PbSO₄ | pH | Percent Pb Converted to PbSO₄ | pH |
| Time hrs.: | | | | | | | | |
| 0 | 2.1 | 5.0 | 2.5 | 5.2 | | | 2.4 | 4.1 |
| ½ | | | 19.4 | 5.7 | | | 42.2 | 5.0 |
| 1 | | | 27.1 | 6.0 | 42.5 | 4.5 | 64.2 | 5.0 |
| 2 | 17.5 | 5.5 | 36.3 | 5.9 | 60.5 | 4.9 | 92.2 | 2.5 |
| 3 | | | 46.5 | 5.9 | 75.0 | 5.0 | 94.8 | 2.0 |
| 4 | 33.2 | 6.0 | 55.5 | 6.0 | 90.5 | 4.9 | 95.1 | 1.8 |
| 5 | | | 64.0 | 6.6 | 96.5 | 4.9 | 95.4 | 1.6 |
| 6 | 42.7 | 5.9 | 71.5 | 6.9 | | | 95.6 | 1.5 |
| 7 | | | 78.5 | 6.4 | | | | |
| 8 | 50.5 | 5.7 | | | | | | |

The residue at the end of the test conducted at 150° C. contained 54.8% as lead sulphate, 3.5% zinc, 11.8% iron, 13 ounces per ton silver, 18% total sulphur, less than 1% elemental sulphur, and about 1% insoluble matter.

It will be noted from Table II that when acid was provided in slight excess of the amount required to combine with the lead as lead sulphate, oxidation of lead sulphide to lead sulphate proceeded rapidly and was 99% complete in two hours when conducted at 90° C. In contradistinction, while the reaction is sulphate forming, it was only 50.5% complete in eight hours at 110° C. when no acid was provided. It is therefore preferred to conduct the oxidation step in the presence of sulphuric acid provided in at least the stoichiometric amount required to combine with the lead as lead sulphate. Also, while the reaction can be conducted at temperatures above 120° C., it is preferred to conduct it below the melting point of sulphur, preferably from about 75° C. to about 110° C. so that sulphide sulphur which is oxidized to elemental sulphur in the presence of sulphuric acid remains in the solid state and does not interfere with the oxidizing reaction.

The lead sulphate forming step, identified as the Oxidation Step 1 on the drawing, is of particular advantage in the treatment of a lead-zinc bulk concentrate such as is produced in the treatment of a lead-zinc complex ore. It is conventional practice in the treatment of such an ore to treat it first by a conventional flotation process to form a bulk lead-zinc concentrate which contains, for example, about 30% zinc and 30% lead. This bulk concentrate is then subjected to flotation to form a high grade zinc concentrate which is passed to a zinc refinery and a high grade lead concentrate which is passed to a lead refinery. This procedure has the disadvantage that the zinc concentrate usually contains some lead and the lead concentrate usually contain some zinc. This results in either the loss of the other metal in the treatment of each concentrate or the operation of apparatus such as slag fuming furnaces to treat the residues from the zinc and lead refineries.

This disadvantage is readily overcome by the oxidation step of the present overall process with the added important advantage that the bulk concentrate can be treated directly and the costs of providing and operating the selective concentration step are avoided. In the treatment of a bulk lead-zinc sulphide concentrate, sufficient sulphuric acid can be provided in the oxidation step to combine with both the lead and the zinc as sulphates. Zinc sulphide is converted to zinc sulphate which is soluble in the solution and can be recovered therefrom by electrolysis after separation of the solid residue and purification. The oxidation step is conducted at a temperature below the melting temperature of sulphur, preferably within the range of from 75° to 110° C. in the presence of a free oxygen containing gas and under a positive pressure of oxygen above about two pounds per square inch. Sulphide sulphur which is oxidized to elemental sulphur during this reaction remains in the solid state and does not interfere with the oxidation reaction by the occlusion or the wetting of the mineral sulphides.

Alternatively, only sufficient acid can be provided to combine with the lead as lead sulphate in which case both the lead and zinc report in the solid residue. The lead sulphate can then be separated from this residue by the amine leaching process of this invention and the zinc and precious metals contents of the residue from the amine leaching process can be recovered by any known method.

The solid residue, after separation of the solution can be, if desired, treated for the separation and recovery of elemental sulphur formed during the oxidation step.

The solid residue from the oxidation step is passed to the amine leaching step, identified on the drawing as Leaching Step 2. The leach solution employed consists of a basic aqueous solution which contains at least one member selected from the group consisting of alkylene and alkanol amines and derivatives thereof which is soluble in water and which is present in amount sufficient to combine with the lead content of the charge. These reagents have the advantages that they are miscible in water and water is miscible in them; they are stable within the temperature range within which very rapid and substantially complete dissolution of lead values is obtained; they have low vapour pressures; natural pH's over pH 12; they are readily available in from 92% to 98% purity, and lead in the form of salts such as lead sulphate, lead chloride, lead nitrate, lead acetate and the like is highly soluble in aqueous solutions which contain them in sufficient amounts.

The use of ethylene diamine as a reagent is described in detail hereinafter to illustrate the operation of the leaching step of the process.

EXAMPLE 1

Reagent grade lead sulphate was dispersed in aqueous ethylene diamine solution, $NH_2.CH_2.CH_2.NH_2.H_2O$. The mixture was agitated for one hour at 20° C. The solution, after separation of the undissolved residue by filtration, was analyzed for lead and sulphate contents. The results obtained are set out in Table IV.

TABLE IV

Solubility of $PbSO_4$ in ethylene diamine solutions at 20° C.

| Sample No. | Initial Solution | | | Saturated Solution | | |
|---|---|---|---|---|---|---|
| | EDA concentration | | pH | Pb, g./l. | $SO_4$, g./l. | pH |
| | g./l. | Mols | | | | |
| 1 | 52 | 0.9 | 12.1 | 37 | 32 | 10.8 |
| 2 | 103 | 1.7 | 12.3 | 57 | 39 | 10.8 |
| 3 | 170 | 2.8 | 12.6 | 139 | 79 | 10.8 |
| 4 | 212 | 3.5 | 13.0 | 218 | 112 | 11.0 |
| 5 | 226 | 3.8 | 13.2 | 261 | 142 | 11.5 |
| 6 | 273 | 4.5 | 13.2 | 326 | 165 | 11.6 |
| 7 | 296 | 5.0 | 13.5 | 356 | 165 | 11.7 |
| 8 | 328 | 5.5 | 13.6 | 414 | 193 | 11.9 |
| 9 | 374 | 6.2 | 14.0 | 482 | 222 | 12.1 |
| 10 | 395 | 6.6 | 14 | 526 | 258 | 12.4 |
| Max. Solubility: | | | | | | |
| 11 | 430 | 7.2 | 14 | 662 | 312 | 13 |
| 12 | 596 | 10.0 | 14 | 2.2 | 0.8 | 14 |
| 13 | 612 | 10.2 | 14 | 0.15 | tr | 14 |
| 14 | 636 | 10.5 | 14 | tr | tr | 14 |

It will be noted that the maximum solubility of lead in this series of tests was obtained with a solution which contained between 430 and 596 grams of ethylene diamine per litre. Actually, it was found in other experiments that while satisfactory results are obtained with as little as 50 grams per litre maximum solubility is obtained with about 535 grams of ethylene diamine per litre. Above that concentration, the solubility of lead in the solution drops sharply to substantially zero.

It has been found that from 200 to 500 grams per litre of lead will dissolve in a basic aqueous solution which contains from 200 to 400 grams of ethylene diamine per litre. In order to maintain a high efficiency in leaching and washing it is preferred to use a solution which contains from 3.5 to 4.5 mols, 210 to 270 grams per litre, of ethylene diamine and a small amount, about 0.2 mol, about 25 grams per litre, of ethylene diaminium sulphate per litre and to agitate the mixture for about 30 minutes at a temperature of from about 10° C. to about 100° C., preferably at room temperature, from about 20° C. to 25° C.

The solution produced by leaching lead sulphate with ethylene diamine contains, principally, a lead-ethylene diamine-sulphate complex with a minor amount of impurities. The leaching step is, however, quite selective and impurities such as silver and zinc sulphide are not dissolved by the solution and, therefore, remain in the residue.

The leach solution can be separated from the undissolved residue by a conventional liquid-solids separation step, such as by filtration. The solid residue can be discarded or it can be passed to further treatment for the recovery of residual valuable constituents as desired.

Dissolved lead values can be recovered from the solution by one of several ways. We have found, for example, that lead of high purity can be recovered from the solution by electrolysis using an insoluble anode.

A further procedure is to dilute the solution and precipitate the dissolved lead values as basic lead sulphate by hydrolysis.

A preferred procedure, indicated as the Carbonation Step 3 on the flow sheet drawing, comprises the steps of reacting the solution with carbon dioxide. We have found that lead carbonate is less soluble in the lead-ethylene diamine-ethylene diaminium sulphate solution than is lead sulphate. The clarified lead-bearing leach solution is passed to a reaction vessel which can be of a type such as a splash tower. Carbon dioxide gas is fed into the solution to combine with dissolved lead values as lead carbonate, $PbCO_3$, which is insoluble in and precipitates from the solution. Also, some of the dissolved lead values precipitate from the solution by hydrolysis so that the resulting precipitate is a basic lead carbonate having the approximate formula $PbCO_3 \cdot xPb(OH)_2$.

The carbonation step can be conducted at room temperature. However, we have found that the most satisfactory results as regards the rate and the extent of precipitation are obtained when the solution is heated from room temperature, about 20° C., to about 90° C. during the reaction.

Complete precipitation can be obtained by using an excess of carbon dioxide. However, it is found that the most satisfactory results are obtained when from 0.3 to 0.7 mol of carbon dioxide per mol of lead is supplied to the reaction vessel. The reason for this is that progressively increasing amounts of carbon dioxide are required to precipitate progressively decreasing amounts of lead. Thus, the resulting solution would contain a high carbon dioxide content which would have to be reduced or removed before the solution could be recycled to the leaching step after regeneration of the ethylene diamine content. Thus, while from 30 to 50 grams of lead per litre may remain dissolved in the solution, it is preferred to operate this step of the overall process with less than one mol of carbon dioxide per mol of dissolved lead in order to produce a residual solution which contains a minimum of dissolved carbon dioxide.

Precipitated basic lead carbonate can be separated from the leach solution by a conventional solids-liquid separation step, such as by filtration. Clarified solution which contains from 30 to 50 grams of dissolved lead per litre, about 20 grams of carbon dioxide per litre, about 160 grams of ethylene diaminium sulphate per litre, and about 60 grams of free ethylene diamine can be reacted with lime, CaO, which reacts with ethylene diaminium sulphate to form ethylene diamine and calcium sulphate which is insoluble in and precipitates from the solution. Precipitated calcium sulphate can be separated from the solution by filtration. As stated hereinbefore, it is preferred to have about 25 grams per litre of ethylene diaminium sulphate in the solution in the leaching step. Thus, the lime is supplied to the solution in amount sufficient to leave a desired amount of ethylene diaminium sulphate in the solution. This step is identified on the drawing as the Regeneration Step 5.

Precipitated basic lead carbonate and calcium sulphate usually are washed with water to free them from entrained solution. Wash waters can be added to the ethylene diamine solution recycled to the leaching step.

The basic lead carbonate is substantially free from the impurities with which the lead was associated in the lead bearing material. This lead carbonate can be reduced to metallic lead of high purity, for example 99.99% or higher, by reacting it at a temperature of about 750° C. with a reducing agent, such as natural gas in the presence of carbon, for example, petroleum coke.

A preferred procedure for reducing the lead carbonate to metallic lead is as follows. The lead carbonate is formed into pellets which are charged into a shaft furnace which is provided with a lead well in its base and a bed of petroleum coke maintained above the lead well. Natural gas is fed into the furnace below the bed of petroleum coke and flows in countercurrent to the downward flow of lead carbonate pellets. Reduced lead flows downwardly through the coke bed into the lead well from which it can be withdrawn continuously or intermittently according to conventional practice. Carbon dioxide, moisture vapour and combustion gas flow upwardly and can be withdrawn from the upper part of the furnace.

The reactions which take place in this operation can be expressed by the following equations:

$$PbCO_3 + heat \rightarrow PbO + CO_2$$
$$PbO + reducing\ agent \rightarrow Pb + H_2O$$

The following example illustrates the operation of the overall process.

EXAMPLE 2

A lead sulphide concentrate contained, by weight, 62.8% lead, 3.5% zinc, 12.7% iron, 17.6% sulphur, 15.4 ounces of silver per ton and 1.1 insoluble matter.

1500 grams of this sulphide were ground to a particle size of substantially 100% smaller than 43 microns. Ground sulphides were dispersed in 3000 ml. of an aqueous sulphuric acid solution which contained 260 ml. of 96% sulphuric acid to form a slurry which contained 33% solids. The oxidation reaction was conducted at 90° C. in a closed reaction vessel under a partial pressure of oxygen of 5 pounds per square inch for 4 hours. At the end of the four hour period the charge was cooled to atmospheric temperature and the solid residue was separated by filtration. After washing with water, 1970 grams of solid residue contained 47.7% total lead, 47.1% lead as lead sulphate, 2.5% zinc, 10.4% iron, 18% total sulphur, 11.6% elemental sulphur. All of the lead and 97% of the zinc reported in the solid residue and 98.7% of the lead was converted to lead sulphate.

The 1970 grams of oxidized solids produced in the oxidation step were dispersed in 4.9 litres of ethylene diamine leach solution formed of recycle solution from the ethylene diamine regeneration step and contained approximately 180 grams per litre free ethylene diamine, 220 grams per litre total ethylene diamine, 18 grams per litre carbon dioxide, 40 grams per litre lead and 70 grams per litre ethylene diaminium sulphate.

The mixture was agitated at 20% C. for 30 minutes. At the end of the leaching period, the solution was separated from solid residue by filtration. The filter cake was washed first with 5% ethylene diamine solution and then with water. The first washing was to remove entrained lead and the second washing was to remove ethylene diamine solution. The solid residue weighed 680 grams and contained by weight 14.6% total lead, 4.6% lead sulphate, 43% total sulphur, 35% elemental sulphur, 10% zinc and 31% iron. 98.5% of the soluble lead was extracted by and dissolved in the leach solution, thereby producing a recovery, in the solution, of 97.0% of the lead contained in the original concentrate.

The washed residue was then re-pulped in water and treated by flotation to separate zinc, unconverted lead sulphides and elemental sulphur, pine oil being used as a frother and secondary butyl xanthate being used as a flotation reagent. The resulting concentrate can be treated separately for the recovery of the zinc and the return of the lead values to oxidation or the leaching step of this process, if desired.

The leach solution, without added wash solution amounted to 4.9 litres and contained 60 grams per litre free ethylene diamine, 220 grams per litre total ethylene diamine, 8 grams per litre carbon dioxide, 200 grams per litre lead, and 70 grams per litre ethylene diaminium sulphate.

This solution does not require purification and, therefore, it was passed directly to the carbonation step wherein it was reacted with a total of 35 grams per litre carbon dioxide, 18 grams per litre being present in the solution and 17 grams per litre, 0.6 mol per mol of lead, being supplied. This reaction was conducted at 90° C. for 4 minutes, after which the slurry was cooled to room temperature and the solids separated from the solution by filtration. The solids, after washing and drying, weighed 1100 grams and consisted essentially of basic lead carbonate and contained 81% lead, 9% carbon dioxide, a trace of sulphur, a trace of ethylene diamine and the balance chemically bound water.

1100 grams of lead carbonate was reacted with a reducing agent at about 750° C. in the manner described hereinabove. 904 grams of metallic lead was produced which had a purity of 99.99+%. This represented a recovery of 97% of lead contained in the lead sulphide starting material.

Calcium oxide was added to the end solution from the precipitation step in about 10% excess of the amount necessary to combine with the ethylene diaminium sulphate content of the solution equivalent to the lead precipitated in the carbonation step to form calcium sulphate and regenerate ethylene diamine. Calcium sulphate is insoluble in and precipitates from the solution and can be separated therefrom by filtration. Regenerated ethylene diamine solution is recycled to the amine leaching step. Precipitated calcium sulphate was analyzed and found to contain 3.5% carbon dioxide, 0.4% lead, trace of ethylene diamine, 10% unreacted calcium oxide and the balance was a hydrated calcium sulphate.

It is found further that precious metals such as silver and gold contained in the original sulphides can be recovered from the undissolved residue from the oxidation step, such as by cyanidation. In actual operation, about 15% of the silver dissolved in the acid leach solution from the oxidation step from which it can be recovered by cementation or by chemical precipitation. The bulk of the silver contained the original lead concentrate reported in the residue and was not attacked by the amine leach solution. The product lead contained only 0.002 ounce of silver per ton of lead. This is substantially below the 0.20 ounce of silver per ton which is found to be contained in product lead produced by an electrolytic process.

What we claim as new and desire to protect by Letters Patent of the United States is:

1. In a process for the production of lead from lead bearing material, the improvement which comprises leaching a lead compound selected from the group consisting of lead sulphate, lead chloride, lead nitrate, lead acetate and lead oxide with a basic aqueous solution which contains a member selected from the group consisting of alkylene and alkanol amines and acid salts and derivatives thereof which is soluble in water and which is present in amount sufficient to combine with the lead content of said lead compound.

2. In a process for the production of lead from lead bearing material, the improvement which comprises leaching, at a temperature within the range of from about 10° C. to about 100° C., a lead compound selected from the group consisting of lead sulphate, lead chloride, lead nitrate, lead acetate, and lead oxide with a basic aqueous solution containing a member selected from the group consisting of alkylene and alkanol amines and acid salts and derivatives thereof which is soluble in water and which is present in amount sufficient to combine with the lead content of said lead compound.

3. In a process for the production of lead from lead bearing material, the improvement which comprises leaching a lead compound selected from the group consisting of lead sulphate, lead chloride, lead nitrate, lead acetate, and lead oxide with a basic aqueous solution which contains a member selected from the group consisting of alkylene and alkanol amines and acid salts and derivatives thereof which is soluble in water and which is present in amount sufficient to combine with the lead content of said lead compound, reacting said solution with carbon dioxide to precipitate dissolved lead values as lead carbonate, and separating precipitated lead carbonate from said solution.

4. In a process for the production of lead from lead bearing material, the improvement which comprises leaching a lead compound selected from the group consisting of lead sulphate, lead chloride, lead nitrate, lead acetate, and lead oxide with a basic aqueous solution which contains a member selected from the group consisting of alkylene and alkanol amines and acid salts and derivatives thereof which is soluble in water and which is present in amount sufficient to combine with the lead content of said lead compound, reacting said solution with carbon dioxide to precipitate dissolved lead values as lead carbonate, separating precipitated lead carbonate from said solution, regenerating the amine content of said solution, recycling regenerated solution to the leaching step and reacting said precipitated lead values under reducing conditions to produce metallic lead substantially free from impurities.

5. In a process for the production of lead from lead bearing material, the improvement which comprises leaching a lead compound selected from the group consisting of lead sulphate, lead chloride, lead nitrate, lead acetate and lead oxide with a basic aqueous ethylene diamine solution which contains from about 50 to about 535 grams of ethylene diamine per litre.

6. The process according to claim 5 in which at least about 25 grams per litre of ethylene diaminium sulphate are present in the leach solution.

7. In a process for the production of lead from lead bearing material, the improvement which comprises leaching a lead compound selected from the group consisting of lead sulphate, lead chloride, lead nitrate, lead acetate and lead oxide with a basic aqueous ethylene diamine solution which contains from about 50 to about 535 grams of ethylene diamine per litre, separating undissolved residue from the leach solution, reacting the leach solution with carbon dioxide in a mol ratio of from about 0.3 to about 0.7 mol of carbon dioxide per mol of dissolved lead to precipitate dissolved lead values as lead carbonate, and separating precipitated lead compounds from the solution.

8. In a process for producing lead from lead sulphides, which comprises the steps of reacting the lead sulphides with a free oxygen containing gas in an aqueous sulphuric acid solution which contains free sulphuric acid in amount sufficient to combine with the lead content of said lead bearing material as lead sulphate, continuing the oxidation reaction to convert said lead sulphides to lead sulphate, separating the solid residue from the sulphuric acid solution, the improvement which comprises leaching said solid residue with a basic ethylene diamine solution which contains from about 50 to about 535 grams of ethylene diamine per litre, continuing said leaching step to dissolve the lead sulphate content of said solid residue in said leach solution, separating undissolved residue from said ethylene diamine leach solution, reacting said ethylene diamine leach solution with carbon dioxide to precipitate dissolved lead values as basic lead carbonate, and separating precipitated basic lead carbonate from said ethylene diamine solution.

9. In a process for producing lead from lead bearing material, the improvement which comprises the step of leaching a lead compound selected from the group consisting of lead sulphate, lead chloride, lead nitrate, lead acetate, and lead oxide with a basic aqueous solution which contains a reagent selected from the group consisting of ethylene diamine, diethylene triamine, triethylene tetramine, tetraethylene pentamine, propylene diamine, monoethanol amine, diethanol amine, triethanol amine and derivatives thereof, said member being present in amount sufficient to combine with the lead content of said lead compound as a lead amine compound which is soluble in said solution.

References Cited in the file of this patent

UNITED STATES PATENTS

| | | |
|---|---|---|
| 2,722,481 | Werntz | Nov. 1, 1955 |
| 2,729,557 | Booth et al. | Jan. 3, 1956 |
| 2,839,387 | Burton | June 17, 1958 |